United States Patent [19]

Ackermann et al.

[11] Patent Number: 5,526,998
[45] Date of Patent: Jun. 18, 1996

[54] TAKE-UP SYSTEM FOR PHOTOGRAPHIC MATERIAL IN STRIP-FORM

[75] Inventors: Rudolf Ackermann, Widen; Hanspeter Schärer, Dällikon, both of Switzerland

[73] Assignee: Gretag Imaging AG, Regensdorf, Switzerland

[21] Appl. No.: 261,197

[22] Filed: Jun. 16, 1994

[30] Foreign Application Priority Data

Jun. 17, 1993 [DE] Germany .............................. 93810436.1

[51] Int. Cl.$^6$ ............................................. G03B 27/58
[52] U.S. Cl. ............................ 242/532.7; 242/332.7; 242/564.4
[58] Field of Search ................. 242/580, 580.1, 242/332.7, 348.2, 532, 532.7, 534, 563.1, 564.4; 354/275, 345, 346

[56] References Cited

U.S. PATENT DOCUMENTS

| | | | |
|---|---|---|---|
| 3,277,007 | 10/1966 | Schwardt | 242/532.7 X |
| 3,613,977 | 10/1971 | Egan | 242/348.2 X |
| 3,650,389 | 3/1972 | Mook | 242/580 X |
| 4,504,026 | 3/1985 | Serizawa et al. | 242/532 |
| 4,544,110 | 10/1985 | Nagel et al. | 242/532 |
| 4,688,737 | 8/1987 | Kogane et al. | 242/532.7 X |
| 5,131,592 | 7/1992 | Shibata et al. | 242/532.7 |
| 5,187,531 | 2/1993 | Ozawa et al. | 242/564.4 X |
| 5,284,305 | 2/1994 | Gassman et al. | |
| 5,343,266 | 8/1994 | Pummell et al. | 354/345 X |

FOREIGN PATENT DOCUMENTS

| | | |
|---|---|---|
| 0362780 | 4/1990 | European Pat. Off. . |
| 0463997 | 1/1992 | European Pat. Off. . |
| 3538082 | 4/1986 | Germany . |
| 4204340 | 8/1993 | Germany ............... 242/532.7 |

Primary Examiner—Daniel P. Stodola
Assistant Examiner—William A. Rivera
Attorney, Agent, or Firm—Burns Doane Swecker and Mathis

[57] ABSTRACT

A system for handling strip-form photographic material in which the photographic strip material can be wound up onto a take-up core of a strip material cartridge (film reel or cartridge or paper cartridge) that can be attached or affixed at the take-up side or the uncoiling side in the processing stations of a photographic processing system. The strip material cartridge can be equipped with a holding and clamping system for the end of the photographic strip material, and this system can be operated manually or with the help of a preferably automatic operating system in such a way that the end of the wound up photographic strip material is available held and clamped or loose.

12 Claims, 9 Drawing Sheets

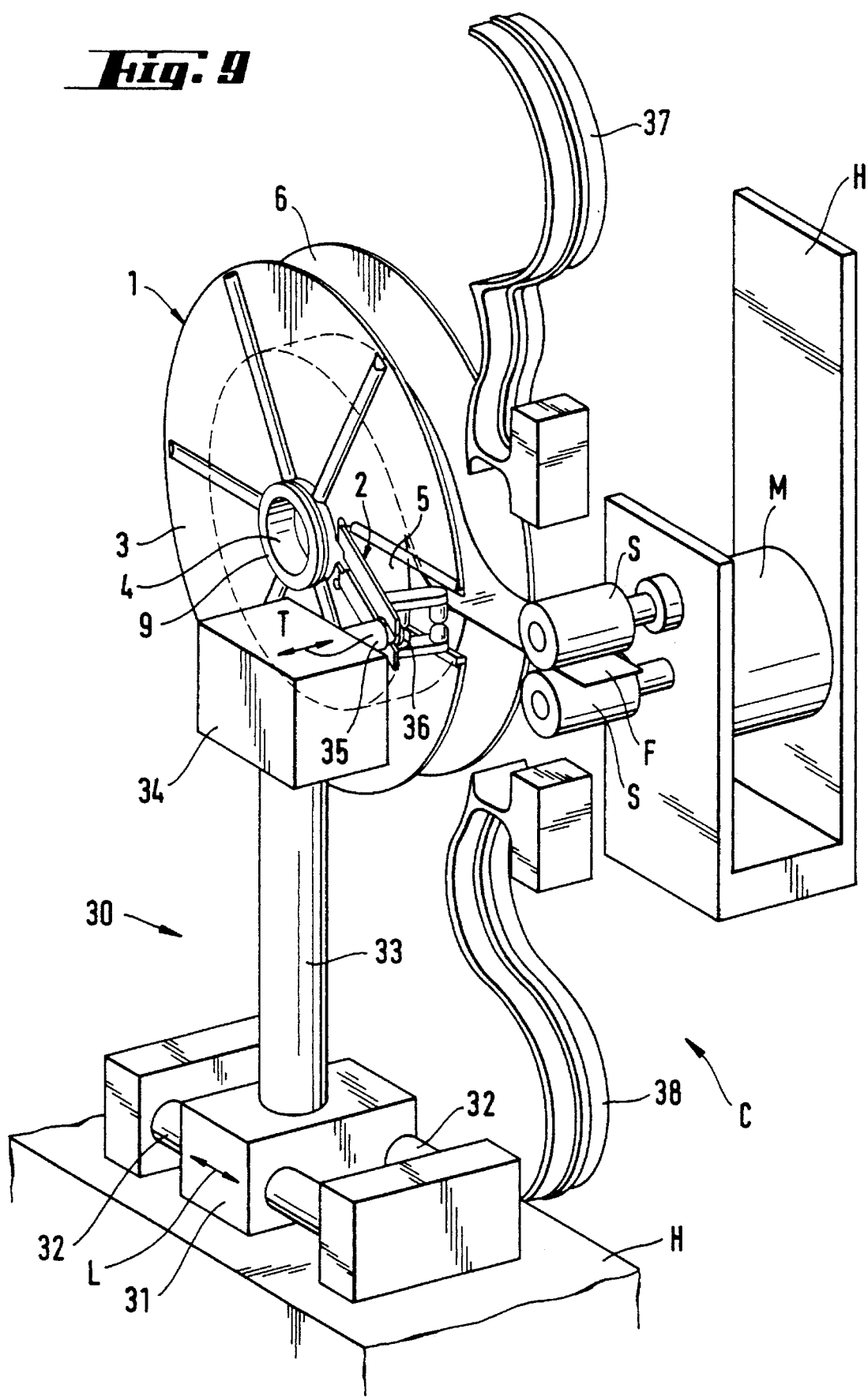

TAKE-UP SYSTEM FOR PHOTOGRAPHIC MATERIAL IN STRIP-FORM

BACKGROUND OF THE INVENTION

The present invention relates to a take-up system for strip-form photographic material in which the photographic strip material can be wound up onto a take-up core of a strip material cartridge (film reel or cartridge or paper cartridge) that can be attached or affixed at the take-up side or the uncoiling side in the processing stations of a photographic processing system.

Photo labs that process certain types of exposed film materials, usually negative films in 135 format, in very large quantities are increasingly coming under the pressure of their customers who want their orders filled in ever shorter times. For this purpose, the individual processing steps, from introduction of the exposed film material and its development through preparation of the desired number of copies in the desired format, usually paper prints in 3"×4.5" to 5"×7.5" formats, to packaging of the film negatives and paper prints, are carried out with the help of various high-speed machines and sometimes still manually supported.

Above all, at the beginning and the end of the individual processing steps, the operating personnel is often still used to insert film or paper rolls into an automatic threader, for example, or to take coiled film or paper rolls from one station and transport them to the next, where they rearrange them for use again. The work speed required from the operating personnel is relatively high and is largely determined by the very high processing speeds of the individual processing stations. In addition to the high work speed, extreme precision and accuracy are demanded from the operating personnel to prevent faulty order processing or undesired down-time of the individual processing stations.

The operating personnel must make sure that the loose ends of the photographic strip material (film or paper strips) are not soiled, since such soiling could be passed on to the conveyance means in the individual processing stations. One must avoid accidentally triggering the stopping of the take-up core of a cartridge and turning it in the wrong direction, since in this case the strip material can be pulled into the cartridge and can only be pulled back out with difficulty. The operating personnel must also make sure that the front ends do not get caught and damaged, since this could lead to problems in threading the strip material, which in turn could lead to undesired down-time for the processing station or the entire processing system.

With modern photographic processing systems, there is a trend toward largely relieving the operating personnel from their intervening function. In particular, the photographic strip material, film or paper, is to be automatically transported between the individual processing stations and automatically threaded in, uncoiled and taken up again onto reels in the processing stations. In the process, there is the problem that the typical reels or cartridges are not designed for automatic grappling. The photographic strip material, film or paper, cannot be automatically grasped and threaded into the respective processing station. With most processing stations, the strip material can indeed be quasi-automatically taken up onto a reel or cartridge at the exit, but it is then not in a suitable form to be automatically grappled again and uncoiled at the next station.

SUMMARY OF INVENTION

The present invention is thus directed to remedying the aforementioned problems. A take-up system for strip-form photographic material is to be created which ensures that the strip material will not uncoil unintentionally, and in which the take-up core cannot be rotated accidentally. The take-up and uncoiling system should make it possible to automatically grapple, thread in and uncoil the photographic strip material. The photographic strip material should be taken up on the way out of the processing station and its strip end prepared in such a way that after the strip material cartridge is passed on to the entrance of the following station, the strip material can be automatically handled once again. A human intervention between the individual stations should be able to be largely dispensed with.

In particular, a take-up system for strip-form photographic material is created in which the photographic strip material can be wound onto a take-up core of a strip material cartridge (film reel or cartridge or paper cartridge) that can be attached or affixed at the uncoiling or take-up side in processing stations of a photographic processing system. The strip material cartridge is equipped with a holding and clamping system for the end of the photographic strip material; this system can be operated manually or with the help of an automatic operating device in such a way that the end of the coiled photographic strip material is available either held and clamped or loose.

In a particularly preferred further development, operating systems are provided on the uncoiling or take-up systems of the individual processing stations, respectively, and can be automatically engaged with the integrated holding and clamping system of the strip material cartridge in order to open or close it.

BRIEF DESCRIPTION OF THE DRAWINGS

Other objects and advantages will become apparent from the following detailed description of preferred embodiments of the invention as described in conjunction with the accompanying drawings wherein like reference numerals are applied to like element and wherein.

DETAILED DESCRIPTION OF THE PREFERRED EMBODIMENTS

In the following, the invention is explained with the example of a film reel and uncoiling and take-up devices at corresponding processing stations of a photographic processing system. Such uncoiling systems for film reels are provided at a photographic copying apparatus and at a cutting and packaging station, for example. The take-up devices for the film reels are arranged at the exit of a film processor and at the photographic copying apparatus. It is understood, however, that the invention can also be provided in a very similar manner for photo paper coiled on rolls, for uncoiling systems for the photo paper at the photographic copying apparatus and at the entry of the cutting and packaging station and/or for take-up devices for the photo paper at the exit of the copying apparatus and at the exit of the paper processor.

Figure 1:
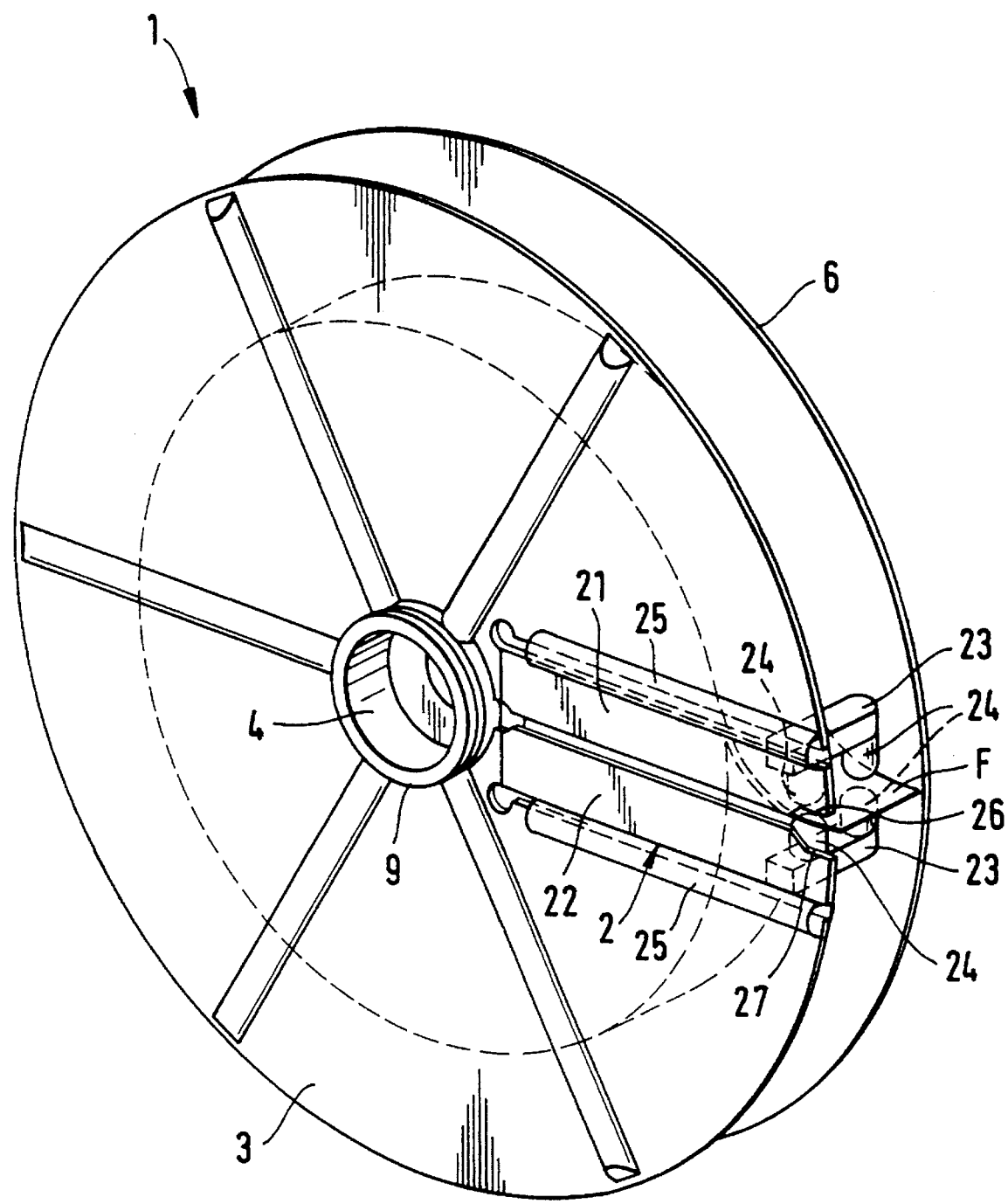
FIG. 1 shows a film reel with a holding and clamping system.
Figure 2:
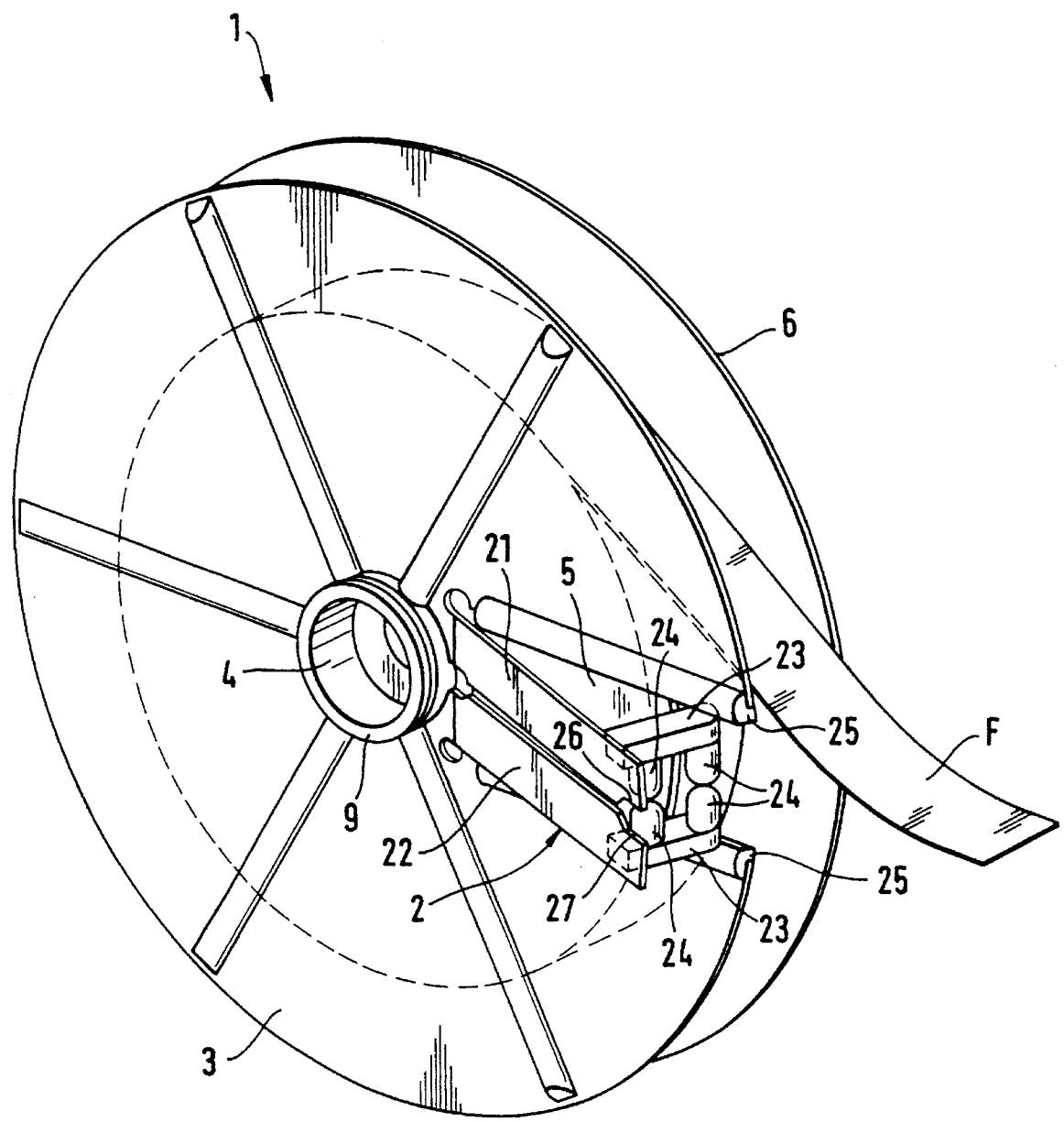
FIG. 2 shows the film reel according to FIG. 1 with holding and clamping system swung out.
Figure 3:
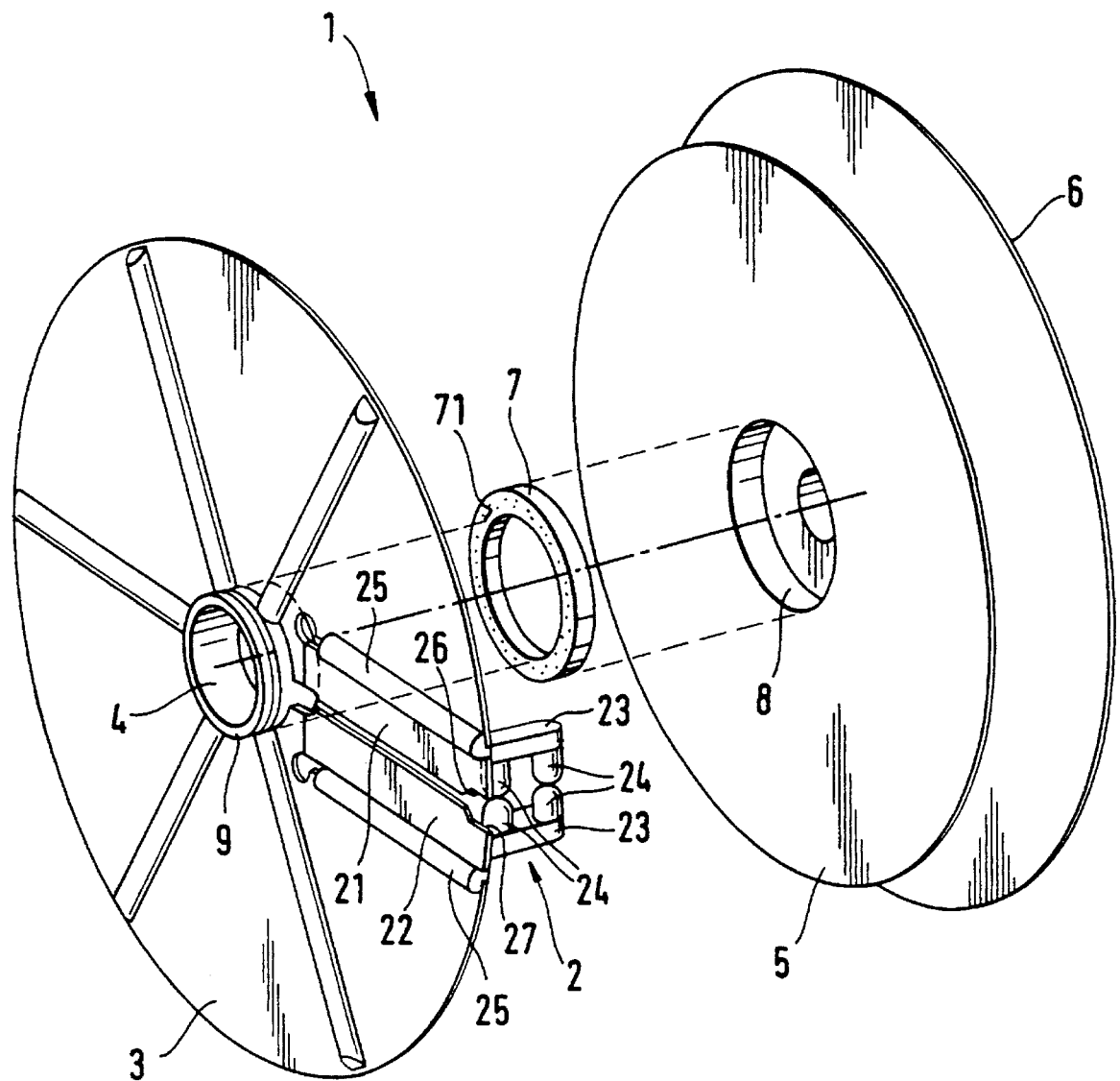
FIG. 3 shows a partially exploded view of the film reel according to FIGS. 1 and 2.

In FIGS. 1–3, a representative exemplary embodiment of a film reel with a holding and clamping system according to the invention is designated by reference number 1; it works with operating systems according to exemplary embodiments of the invention arranged at the uncoiling and take-up sides at the individual processing stations of the photographic processing system. The film reel 1 comprises a take-up core not designated in detail, onto which strip-form film material can be coiled or from which this material can be unwound again. The take-up core has an axial bore 4 that makes it possible to spindle the film reel 1 onto winding spindles in the respective take-up or uncoiling devices of the processing stations. The diameter of the bore 4 is usually standardized and can be 1 inch, for example.

The film reel 1 includes a coil disk 6 and an additional coil disk 3. The additional coil disk 3 of the film reel 1 is equipped with a holding and clamping system 2 for the loose end of the film material strip F. The holding and clamping system 2 extends more or less radially from the take-up core outward. It comprises a movable bracket 21,22 with clamp elements 23,24 attached to it. The bracket 21,22 can be swung out of a first, stable end position, in which the strip material end is clamped and held between the clamp elements 23,24, into a second, stable position in which the clamp elements 23,24 are disengaged from the strip material end. The clamp elements 23,24 are arranged at each of the bracket ends at the periphery of the additional coil disk 3 and extend more or less crosswise to the additional coil disk 3 and to the surface of the film material F.

In the film reel 1 shown as an example, the bracket 21,22 is divided in two, and each bracket part has a clamp element 23,24 at its front end at the periphery of the additional coil disk 3. The clamp elements in this process are clamp fingers 24 that are formed on a hook part 23 protruding more or less vertically from the bracket and extending crosswise to the surface of the film material. The clamp fingers 24 of the hook part 23 attached on the upper bracket part 21 and those of the hook part attached on the lower bracket part are situated directly across from each other. It is understood that instead of the hook parts 23 with clamp fingers 24, for example, a continuous clamp strip can also be provided at the front ends of each of the bracket parts 21,22.

At the front ends of the bracket parts 21,22, recesses 26,27 each situated across from each other are provided that serve to receive a corresponding device on the operating system, with the help of which the clamp elements 23,24 can be spread apart.

The swinging bracket parts 21,22 can be formed integrally on the additional coil disk 3. Between the two bracket parts 21,22, a narrow, radial gap is left open. Above and below the bracket parts 21,22, clamping beads 25 are provided that extend radially from the take-up core more or less parallel to the extension of the bracket parts 21,22 outward. The clamping beads 25 serve to press the bracket parts 21,22 together in a swung in condition.

The partially exploded view in FIG. 3 shows that the holding and clamping system 2 is provided in the additional coil disk 3. The film reel 1 thus comprises three coil disks. Two of the coil disks 5,6 form the lateral limit walls of the take-up core. In the process, one of the coil disks 5 has a smaller diameter than the second 6, which also represents a lateral wall of the film reel 1. The second lateral wall of the film reel 1 is formed by the additional coil disk 3 in which the holding and clamping system 2 for the free film end is integrated. The diameter of the additional coil disk 3 corresponds to the diameter of the coil disk 6, which forms the first lateral wall of the film reel.

The additional coil disk 3 is lodged rotatable in relation to the smaller coil disk situated further inward. For this purpose, an axial recess 8 is provided on the side of the smaller coil disk in the take-up core; it serves to receive a bearing part 7. This bearing part 7 is arranged between the smaller coil disk 5 and the additional coil disk and has a frictional surface 71 on the side facing the additional coil disk 3. With assembled film reel 1 and holding and clamping system 2 swung in, the frictional surface 71 lies firmly against the inside of the additional coil disk 3, in such a way that the additional coil disk 3 can only be turned by overcoming a considerable frictional resistance against the smaller coil disk. When the holding and clamping system 2 is swung out, the additional coil disk 3 shows a slight axial separation from the bearing part 7 with the frictional surface 71. In this way, the frictional surface 71 and the inside of the additional coil disk are essentially disengaged, and the additional coil disk 3 is easily rotatable in relation to the smaller coil disk 5 arranged inside.

As can be seen in FIG. 3, a receiving device 9 can still be provided on the additional coil disk 3; it makes it possible to grasp the film roll 1 by means of specially designed manipulators. For example, this receiving device 9 can be a cylindrical part protruding approx. 5 mm with a bore diameter that is the same as or greater than the bore diameter 4 of the take-up core.

In the film reel 1 designed according to exemplary embodiments of the invention, the end of the strip-form film material F is held by the clamp elements 23,24 of the holding and clamping system 2. This ensures that the film coil remains firmly wound on the take-up core. During manipulation of the film reel 1, no film material loops can unwind from the coil, which could then come into contact with the ground and thus pick up contamination which, in a further sequence, could soil the transport means in the respective processing station. This method also prevents the hanging end of the film material from possibly getting caught and deformed, which could, in a further sequence, make the threading of the film strip into the specific processing station more difficult.

The film reel 1 according to exemplary embodiments of the invention can be manually transported and spindled onto a motor-driven winding spindle in the uncoiling station or in the take-up station of the respective processing station. The bracket parts 21,22 of the holding and clamping system 2 with the clamp elements 23,24 can be swung out or in by hand in order to prepare the uncoiling or taking up of the film strip. A particular advantage of the film reel 1 according to an exemplary embodiment lies in the fact that it is prepared for use in automated and fully automatic processing systems. In such processing systems, the operating expense of the operating personnel is reduced. In a first stage of automation, the film strip is automatically grasped at the film reel at the entry to the processing stations and threaded in and uncoiled or automatically caught and wound up on the take-up core. At a more highly developed degree of automation of the photographic processing system, the film reels 1 are additionally transported automatically between the individual processing stations and spindled onto winding spindles in the uncoiling or take-up systems. The film reel 1 according to the invention is suitable for use with both degrees of automation, since the holding and clamping system on the film reel can also swing automatically. The operating systems required for this in the uncoiling or take-up systems are described in more detail below.

FIGS. 4–9 show, respectively, a film reel 1 according to an exemplary embodiment of the invention in an uncoiling device U and in a take-up device C in various stages of collusion with operating systems 10 and 30 according to the invention for the holding and clamping systems 2. Such uncoiling devices for the film reels 1 according to the invention can be provided at the entry to the photographic copying apparatus or also at the entry to the cutting and packaging station. The corresponding take-up devices for the film reels 1 according to the invention can be arranged at the exit of the film processor or also at the exit of the photographic printer.

Figure 4:
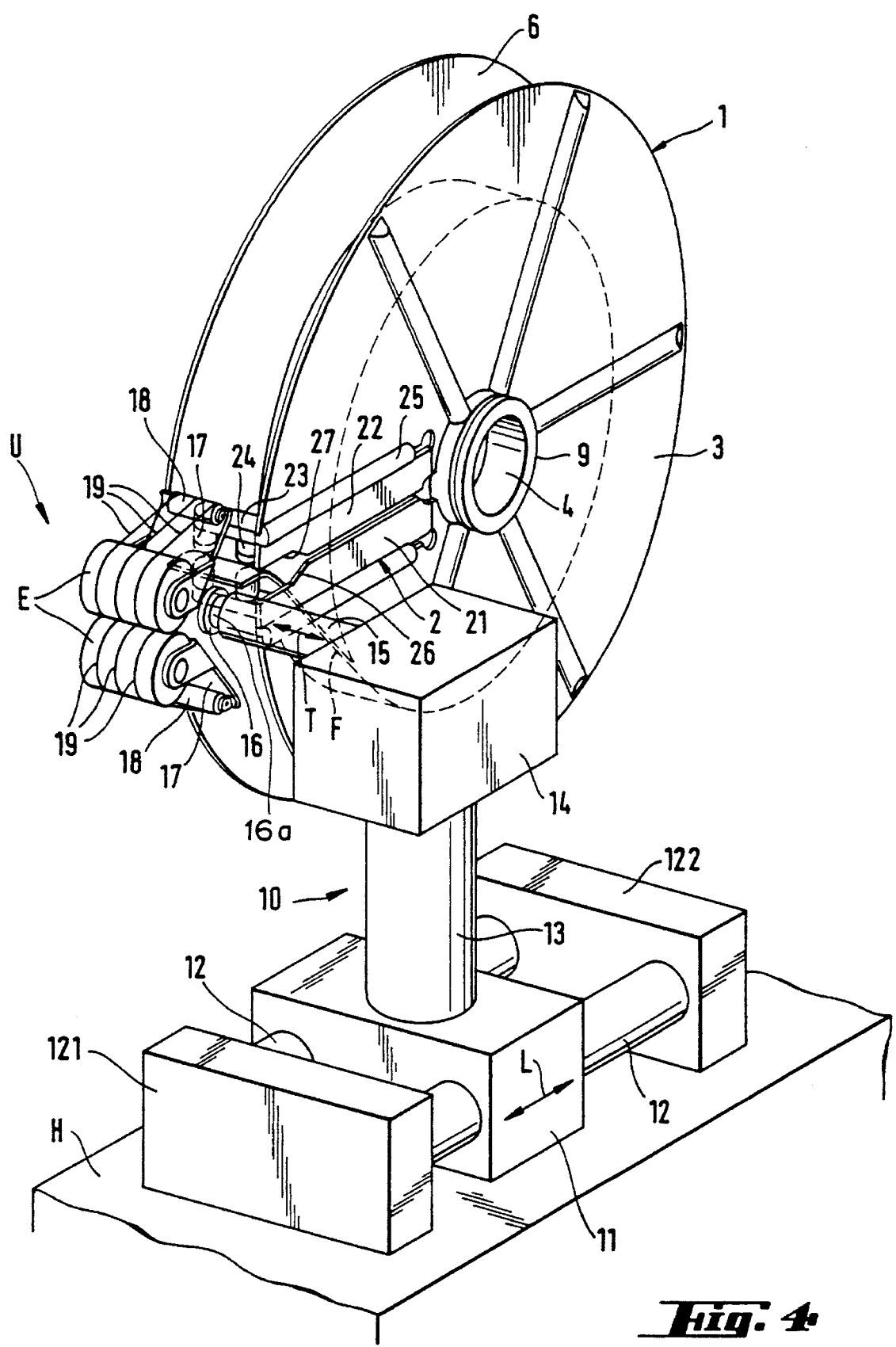
FIG. 4 shows a film reel according to FIGS. 1–3 with an operating system on the uncoiling side.
Figure 5:
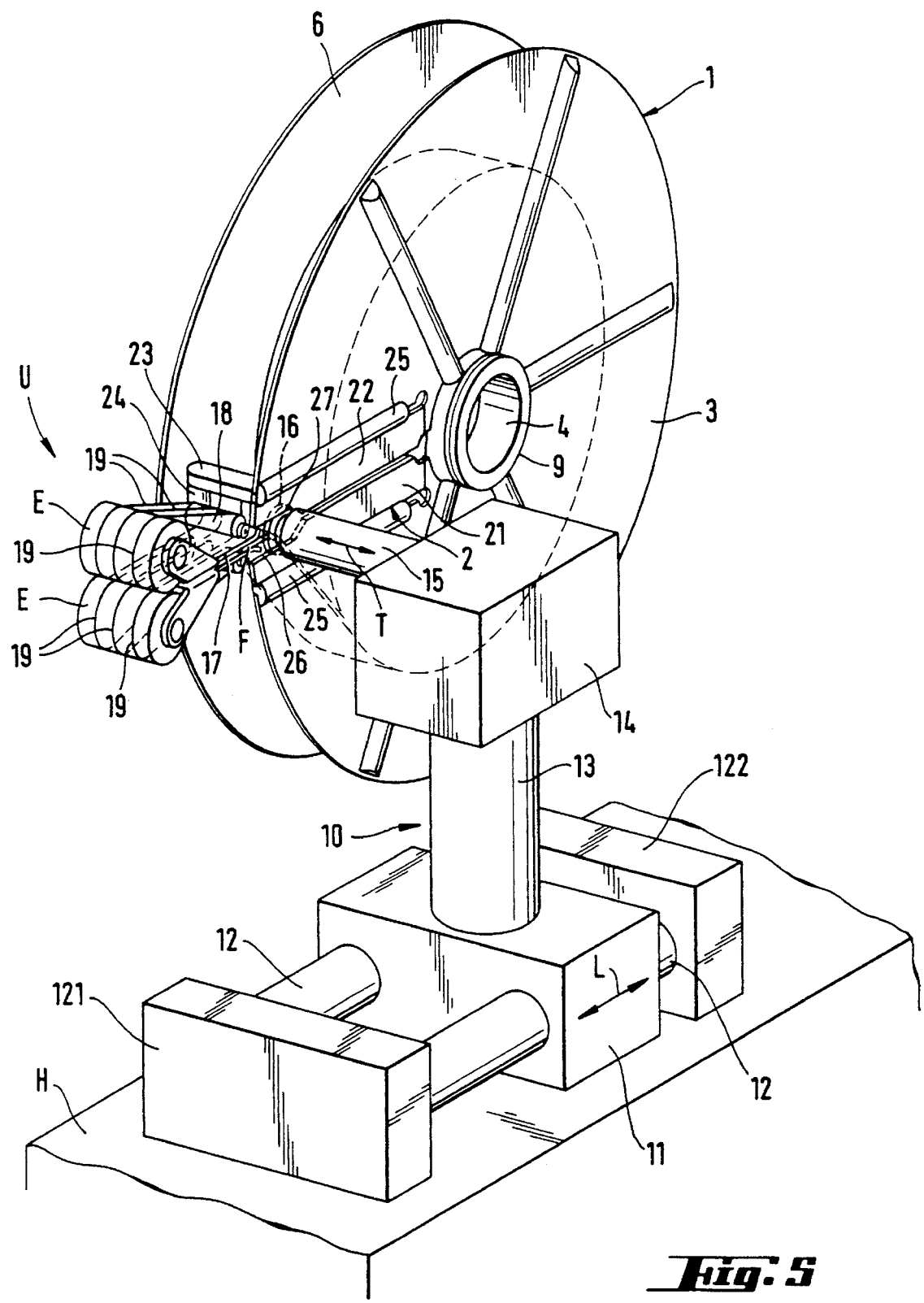
FIG. 5 shows the operating system on the uncoiling side according to FIG. 4 engaged with the holding and clamping system of the film reel.
Figure 6:
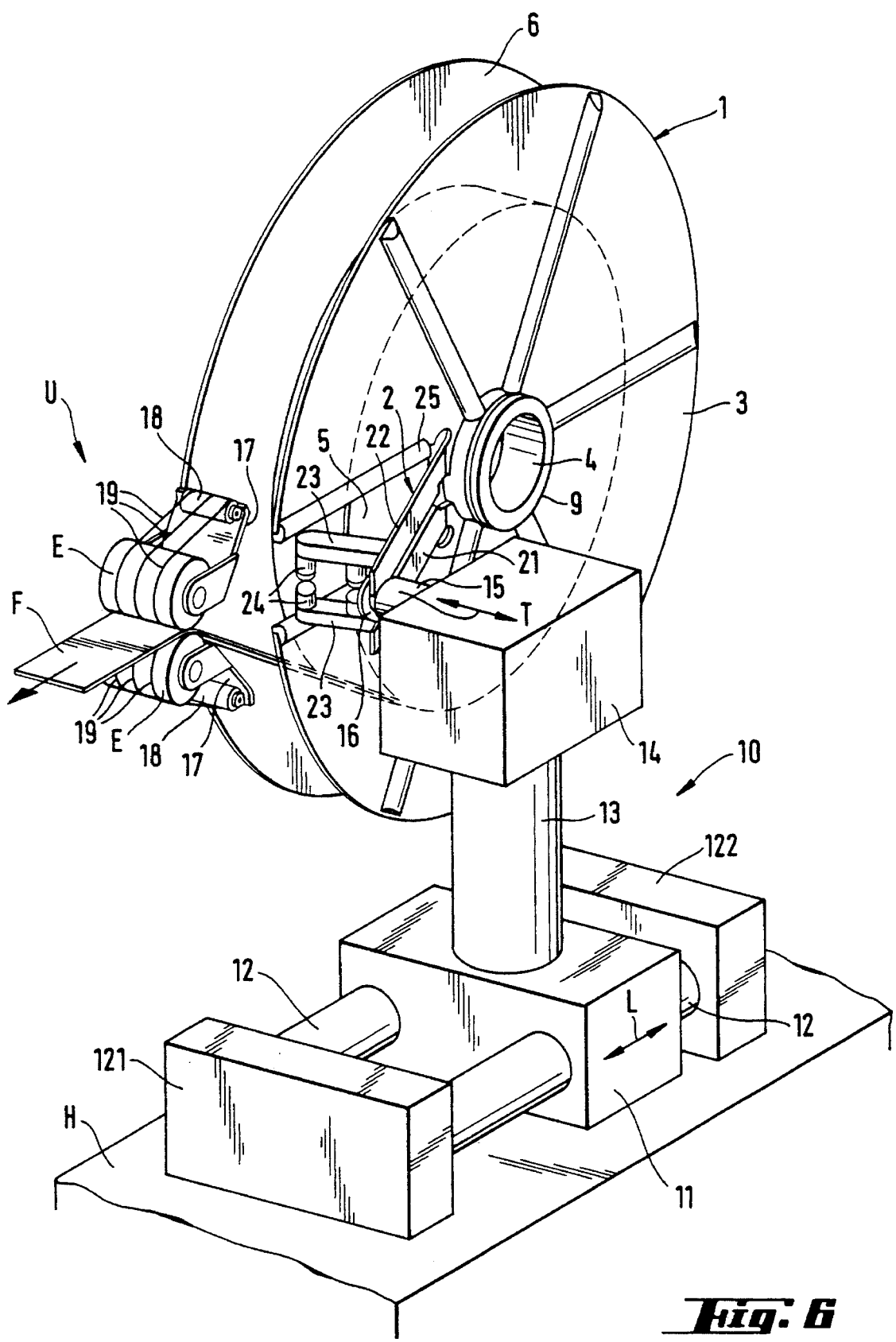
FIG. 6 shows the operating system on the uncoiling side according to FIG. 5 with the holding and clamping system of the film reel swung out.

In FIGS. 4–6, an uncoiling device U arranged at the entry of the corresponding processing stations is shown with the operating system 10 according to an exemplary embodiment of the invention and a film reel 1 according to an exemplary embodiment of the invention. The operating system 10 comprises a sled 11 that can be slid along two guide rods 12 in or against the general conveying direction of the film strip F in the respective processing station, as indicated in the figures by the double arrow L, respectively. The guide rods are locked in between two lateral parts 121,122 that are firmly connected with a housing of the processing station. The longitudinal sliding of the sled is achieved through drive means not shown, for example via a spindle drive.

From the sled 11, a shaft 13 extends more or less vertically upward to approximately the height of a winding spindle that is provided in the uncoiling direction U, and onto which the film reel 1 according to the invention is spindled. At the upper end of the shaft 13, a head piece 14 is arranged which has a device to swing the holding and clamping system 2, in particular the bracket parts 26,27, on the film reel 1. The device for swinging comprises a pin 15 or a similar element that can be moved by an actuator arranged in the head piece 14, e.g. a pneumatic device or a spindle drive, crosswise to the conveyance direction of the strip material F onto the additional coil disk 3 and in the opposite direction, as indicated in each case by the double arrow T.

At the front end of the pin 15, a flat disk 16 is attached that has a groove in its face. In the process, the diameter of the flat disk 16 and the width of the groove 16a are selected in such a way that the groove of disk 16 can be slid along the direction L into the recesses 26,27 at the front end of the bracket parts 21,22. By sliding the flat disk 16 into the recesses 26,27, the bracket parts 21,22 are vertically pressed apart, and the clamping elements 23,24 are slightly removed from each other in such a way that either the clamped strip end is released or a strip end can be shoved in between the clamp elements.

The front ends of the bracket parts 21,22 slide into the groove on the face of the flat disk 16. In this way, when the pin 15 is slid across, the lateral walls of the groove form an abutment for the bracket parts 21,22, which in this way can be automatically swung in or out. Designed in this way, the pin 15 serves with the flat disk 16 to spread the clamping elements 23,24 apart as well as to automatically swing the bracket parts 21,22 out or in.

To catch the end of the film strip F released from the clamping elements 23,24, the operating system 10 on the uncoiling side is equipped with catching means that guide the strip end to a threading device provided at the processing station, as soon as it is released from the holding and clamping system 2. According to the illustrated example of construction, the catching means comprise two swinging guide valves 17 each with a rotatable cylinder 18 on their front ends and with several (three according to the present example) peripheral guide strips 19 that run over the related cylinders 18 of a pair of draw-in rollers E of the respective processing station on the one hand and over the cylinders 18 at the front ends of the guide valves 17 on the other hand. In this way, the guide strips 19 are coupled with the cylinders of the pair of draw-in rollers E and rotatable with this pair in the uncoiling direction.

To uncoil a filled film reel 1 in the uncoiling direction U at the entry to a processing station, the position of the holding and clamping system 2 is set, first by axial turning of the film reel 1 spindled onto the winding spindle, in such a way that the protruding clamped end of the film strip F is arranged approximately at the height of the contact surface of the two cylinders of the pair of draw-in rollers E. This takes place with the help of sensors (not illustrated) that make it possible to establish the position of the holding and clamping system 2 or the front end of the film F. Then the two guide valves 17 with the peripheral guide strips 19 are swung in such a way that the front end of the film F is situated in a guide gap between the two guide valves 17 and is held between the guide strips of the upper and lower guide valve.

The operating system 10 for the holding and clamping system 2 is activated by sliding the sled 11 backward along the guide rods 12 onto the film reel 1. In the process, the pin 15 with the flat disk 16 is pushed between the recesses 26,27 of the bracket parts 21,22 and presses the bracket parts 21,22 vertically apart in such a way that the clamp elements 23,24 release the end of the film strip F. The front ends of the bracket parts 21,22 slide into the groove in the flat disk 16; in this way, by pulling back the pin 15 into the head part 14, the bracket parts 21,22 can be automatically swung out of the first stable swung in position into the second opened position. After the bracket parts 21,22 are swung out, the operating system is typically reactivated in such a way that it is disengaged from the holding and clamping system 2. For this, the sled 11 is simply slid in the conveyance direction of the strip material.

When the bracket parts 21,22 are swung out with the clamping elements 23,24, the free end of the film strip F (or of a spliced on leader strip) is transported with the help of the guide strips 19 up to the pair of draw-in rollers E. As soon as the draw-in rollers E have grasped the strip end, the guide valves 17 are swung back out in order not to hinder the uncoiling of the film reel 1. After the uncoiling of the film reel F, the position of the holding and clamping system 2 is set in the same way as before by means of sensors, and the operating system 10 is again engaged with the holding and clamping system 2 in order to swing it back again by sliding the pin 15 forward. The operating system 10 is then moved back into the original position, and a new film reel can be spindled.

If the operating system 10 remains engaged with the holding and clamping system 2 during uncoiling, even this will only negligibly hinder the uncoiling of the film reel F, since the additional coil disk 3 is easily rotatable in swung out state of the holding and clamping system 2 in relation to the inner, smaller coil disk 5 and the take-up core. In this case the resetting of the position of the holding and clamping means 2 is dispensed with and they can be swung directly back.

Figure 7:
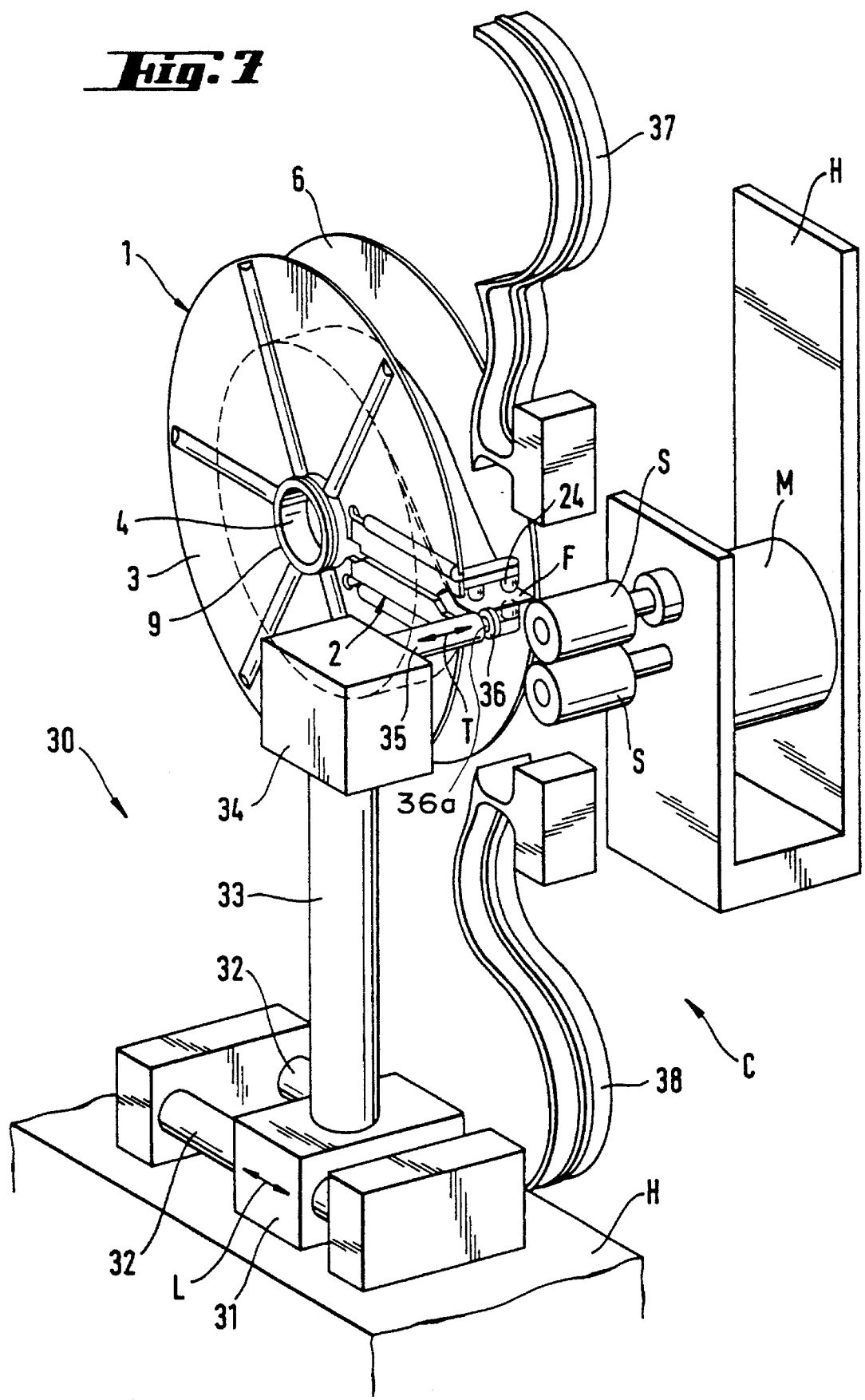
FIG. 7 shows a film reel according to FIGS. 1–3 with a holding and clamping system swung in and with an operating system one, he take-up side.
Figure 8:
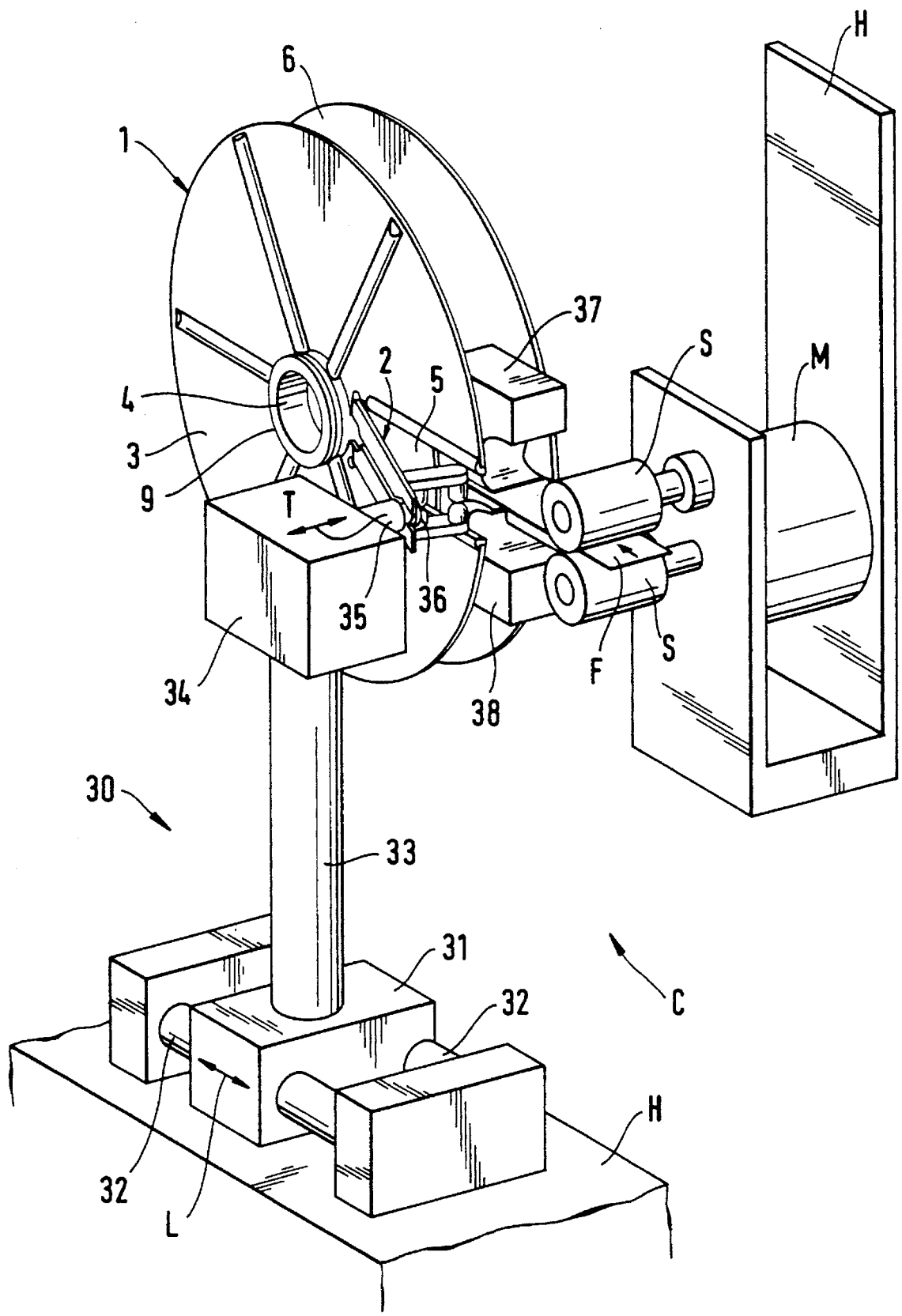
FIG. 8 shows the operating system on the take-up side according to FIG. 7 with holding and clamping system swung out and guide arms swung in; and, FIG. 9 shows the operating system on the take-up side according to FIG. 8 with film reel holding and clamping system swung out and with guide arms swung back.

FIGS. 7–9 show a take-up device C arranged at the exit of the corresponding processing station. The operating system for the holding and clamping system on the film reel i spindled onto the winding spindle is designated in its entirety by reference number 30. Like the operating system 10 at the entry side, a sled 31 can be slid along guide rods 32 according to the double arrow L in or against the general conveyance direction of the strip material in the processing station. From the guide sled, a shaft 33 extends more or less vertically upward and reaches up to approximately the height of the winding spindle in the take-up device C. At the upper end of the shaft 33, a head part is also attached which receives an actuator with the help of which a pin 35 can be pushed forward or backward crosswise to the conveyance direction of the strip material onto film reel 1, as indicated by the double arrow T. The front end of the pin 35 has a flat disk 36 with a groove 36a. The diameter of the flat disk 36 and the width of the groove are measured in such a way that it can be slid into the recesses 26,27 at the front ends of the bracket parts 21,22 of the holding and clamping system 2 and in this way it spreads the clamping elements 23,24 apart, and in such a way that the front ends of the bracket parts 21,22 can slide into the groove.

To ensure that the film material end F pushed out of the processing station is also securely grasped on the take-up core of the film reel 1 spindled on at the exit side, two spoon-shaped guide arms 37,38 that can be swung in are attached in the take-up system C; these guide arms guide the forward strip end onto the take-up core and around it. The spoon-shaped guide arms 37,38 are steered above and below the contact surface of the cylinder of a pair of output rollers S, driven by a motor M, at the housing part H of the processing station at the take-up side. They are swung onto the film reel 1 in such a way that their front areas grasp the take-up core of the film reel. In this way, a channel is created for the forward end of the strip material F pushed out by the pair of output rollers S; this channel extends from the pair of output rollers S to the take-up core of the empty film reel 1. As soon as the film material is caught on the take-up core of the film reel 1, the guide arms 37,38 are swung back again.

The forward end of the strip-form film material F is transported in the processing station to the pair of output rollers S. Before it is pushed out by the pair of output rollers and further conveyed in the direction of the film reel 1, the two guide arms 37,38 are swung back in. They form a channel that reaches from the pair of output rollers S to around the take-up core of the film reel 1. At about the same time as the spoon-shaped guide arms 37,38 are swung in, the operating means 30 for the holding and clamping system on the film reel are activated. For this, the sled 31 is moved along the guide rods 32 onto the film reel 1. The film reel 1 was previously adjusted by rotation in such a way that the holding and clamping system 2 lies at approximately the height of the contact surfaces of the two cylinders of the pair of output rollers S. To recognize the position of the holding and clamping system, sensors are arranged at the output side. The pin 35 penetrates the recesses 26,27 at the front ends of the bracket parts 21,22 and the bracket parts slide into the groove of the flat disk 36 arranged on the pin 35. By pulling back the pin 35, the bracket parts 21,22 are swung out with the clamping elements 23,24. Then, the operating system 30 can be once again disengaged from the holding and clamping system 2. But even if the operating system 30 remains engaged with the holding and clamping system 2, this only negligibly hinders the film strip take-up procedure, since in the opened state of the holding and clamping system 2, the additional coil disk 3 is very easily rotatable in relation to the inner, smaller coil disk. This means that although the additional coil disk 3 is not rotatable, the rest of the reel can be easily turned.

The holding and clamping system 2 then remains in this opened position until the imminent end of the take-up procedure. This can be determined by a sensor that is arranged in front of the pair of output rollers S in the processing station. This detects a leader strip typically spliced on and generates a signal upon which, if necessary, (if the operating system is disengaged) the film reel is first rotated further until the holding and clamping system 2 is once again arranged at approximately the height of the contact surface of the cylinders of the pair of output rollers S. The operating system 30 is then reactivated. After it has been reengaged with the holding and clamping system 2 if necessary (if it was disengaged from the holding and clamping system), the pin 35 is pushed out of the head part 34 again and the holding and clamping system is thereby closed again, whereby the clamping elements 23,24 come to lie above and below the film strip F. After the holding and clamping system 2 is closed, the reel 1 is rotated further until the leader strip end is approximately 5 to 10 mm away from the clamping elements 23,24. This is possible because even in a swung in state, the additional coil disk 3 can still be rotated against a considerable frictional resistance slowly in relation to the rest of the reel. By moving the sled 31 away from the film reel 1, the pin is moved back out of the recesses 26,27 of the bracket parts 21,22, and the clamping elements 23,24 are pressed together again. In this way, the end of the film strip F or a spliced on leader strip is held tight and clamped in such a way that during further manipulation of the film reel 1, the coil cannot loosen and no loop can fall down. Then, the film reel 1 can be comfortably changed manually or automatically and, where necessary, spindled on at the entry to the next processing station.

The system according to the invention was explained using the example of a film reel. As already mentioned at the beginning of the description, principles according to the invention are, of course, also applicable to, for example, strip-form photographic material arranged in cartridges. This can involve film or paper cartridges. The system according to the invention is suitable for manual as well as more or less fully automatic operation of a photographic processing system. The ends of the coiled up, strip-form photographic material are securely clamped by the holding and clamping system. The holding and clamping system can be opened or closed manually as well as fully automatically by operating systems arranged at the entry or exit of the processing stations. For this reason, the system according to the invention can be used in already existing processing stations with manual reel or cartridge changing as well as in partly or completely automated processing systems with automatic reel or cartridge changing and, should the occasion arise, even reel or cartridge transporting between the individual processing stations.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Apparatus for handling photographic strip material using a winding core which is operable for attachment to a photographic processing system, the apparatus comprising:
   a strip material cartridge, said strip material cartridge further including a holding and clamping system for clamping an end of the photographic strip material such that the end of the photographic strip material can be clamped; and
   a movable bracket with clamping elements of the holding and clamping system arranged thereon, said bracket being pivotally mounted within said strip material cartridge for movement between a first stable end position in which the strip material is clamped and held between the clamping elements, and a second stable end position in which the clamping elements are disengaged from the end of the photographic strip material, the bracket being integrated in a vertical lateral wall of the strip material cartridge, and the clamping elements being arranged at an end of the bracket in an area of a periphery of the lateral wall, said clamping elements running substantially crosswise with respect to the lateral wall and to a surface of the strip material, wherein the bracket is divided in two and comprises an upper and a lower bracket part, the clamping elements being arranged at ends of the bracket parts, respectively, and wherein an end of said upper bracket part includes a recess situated across from a recess of an end of the lower bracket part, the recesses of said upper and lower bracket parts being formed to receive an operating system for spreading the clamping elements apart.

2. Apparatus according to claim 1, wherein the holding and clamping system is mounted to an additional lateral wall of the strip material cartridge which is connected with a winding core such that in an opened state of the holding and clamping system, the winding core is easily rotatable, whereas the winding core is more difficult to rotate when the holding and clamping system is swung in.

3. Apparatus according claim 2, in combination with a photographic processing system, wherein the holding and clamping system is located on the strip material cartridge such that an operating system of the photographic processing system is operable to engage the holding and clamping system to open the holding and clamping system and grasp the end of the photographic strip material and to close the holding and clamping system such that the end of the photographic material is clamped and held.

4. Apparatus according to claim 3, wherein the operating system further includes:
   a feeding device with which a forward end of the photographic strip material is forwarded to the winding core of the strip material cartridge.

5. Apparatus according to claim 3, wherein the operating system for the holding and clamping system further includes a sled operable for movement in and against a conveyance direction of the photographic strip material.

6. Apparatus according to claim 5, wherein the operating system further includes:
   said sled is operable slide along at least one guide rod;
   a shaft extending essentially vertically from the sled, at the upper end of which a head piece is located with a device to swing the upper and lower bracket parts and spread open the clamping elements, said device comprising a pin operable for movement by an actuator crosswise to the conveyance direction of the photographic strip material onto the lateral wall and in the opposite direction.

7. Apparatus according to claim 6, wherein a front end of the pin includes:
   a flat disk having a face with a groove, a diameter of the disk as well as a width of the groove being selected such that the flat disk is operable to slide into the recesses at the ends of the upper and lower bracket parts to vertically separate the upper and lower bracket parts on the one hand, and to swing the brackets crosswise by moving the pin on the other hand.

8. Apparatus according to claim 7, wherein the operating system further includes:
   two guide valves with one or more peripheral guide strips that are coupled with a pair of draw-in rollers and are rotatable together with the pair of draw-in rollers in an uncoiling direction.

9. Apparatus according to claim 8, wherein the operating system further includes:
   a feeding device with which a forward end of the photographic strip material is forwarded to the winding core of the strip material cartridge.

10. Apparatus according to claim 9, wherein the feeding device further comprises:
    two spoon-shaped guide arms operable to be swung in and which, in a swung in state, grasp the winding core and form a narrow guide channel for the forward end of the photographic strip material, said channel extending from a pair of conveying rollers of the photographic processing system up to the winding core.

11. Apparatus according to claim 1, wherein the clamping elements include at least one of a clamp strip and a clamp finger located on said ends of the upper and lower bracket parts.

12. Method for handling strip material by winding said strip material with respect to a winding core, said method comprising the steps of:
    attaching said winding core to a photographic processing system;
    establishing a conveyance direction of the strip material onto the winding core using guide arms;
    winding the strip material onto the winding core; and
    clamping an end of the strip material which remains free after winding the strip material onto the winding core, said step of clamping further including a step of actuating a pin in a direction which is crosswise with respect to said conveyance direction to pivot a holding and clamping device into a position which clamps the strip material.

* * * * *